United States Patent [19]
Rosenblad

[11] Patent Number: 4,878,535
[45] Date of Patent: Nov. 7, 1989

[54] SELECTIVE CONDENSATION APPARATUS

[75] Inventor: Axel E. Rosenblad, Seabright, N.J.

[73] Assignee: Rosenblad Corporation, Princeton, N.J.

[21] Appl. No.: 186,639

[22] Filed: Apr. 27, 1988

[51] Int. Cl.⁴ ............................ F28B 1/00; B01D 1/22
[52] U.S. Cl. .................................. 165/114; 159/13.1;
   159/28.6; 159/49; 165/113; 165/115;
   202/185.1; 202/236; 203/89
[58] Field of Search ................. 159/49, DIG. 32, 431,
   159/28.6, 13.1, DIG. 42; 202/269, 197, 236,
   182, 186, 185.1, 202, 262; 203/89, 87; 165/113,
   114, 115

[56] References Cited

U.S. PATENT DOCUMENTS

| 1,546,055 | 7/1925 | Wilson et al. | 196/111 |
| 2,608,387 | 8/1952 | Randall | 159/28.6 |
| 2,953,110 | 9/1960 | Etheridge | 159/28.6 |
| 3,261,392 | 7/1966 | Jacoby | 159/17.1 |
| 3,307,614 | 3/1967 | Rosenblad | 159/28.6 |
| 3,310,105 | 3/1967 | Butt | 159/28.6 |
| 3,332,469 | 7/1967 | Rosenblad | 159/13.3 |
| 3,351,119 | 11/1967 | Rosenblad | 159/13.3 |
| 3,371,709 | 3/1968 | Rosenblad | 159/28.6 |
| 3,559,722 | 2/1971 | Schauls | 159/28.1 |
| 3,627,582 | 12/1971 | Dambrine | 159/28.6 |
| 3,788,954 | 1/1974 | Cantrell | 159/49 |
| 3,808,104 | 4/1974 | Davidson | 159/28.6 |
| 3,946,804 | 3/1976 | Tkach et al. | 159/28.6 |
| 4,216,002 | 8/1980 | Rosenblad | 203/87 |
| 4,230,179 | 10/1980 | Uehara et al. | 165/113 |
| 4,415,407 | 11/1983 | Longuet | 159/13.2 |
| 4,490,215 | 12/1984 | Bannon | 196/111 |

FOREIGN PATENT DOCUMENTS 0987123  3/1965  United Kingdom ............... 159/28.6

Primary Examiner—Virginia Manoharan
Attorney, Agent, or Firm—Brooks Haidt Haffner & Delahunty

[57] ABSTRACT

Heating elements formed by joining a pair of plates around most of their peripheries are provided with an internal partition which separates upper and lower internal spaces within the element so that separate streams of condensate are discharged from the element. A plurality of such plate elements can be used in a falling film condenser.

5 Claims, 2 Drawing Sheets

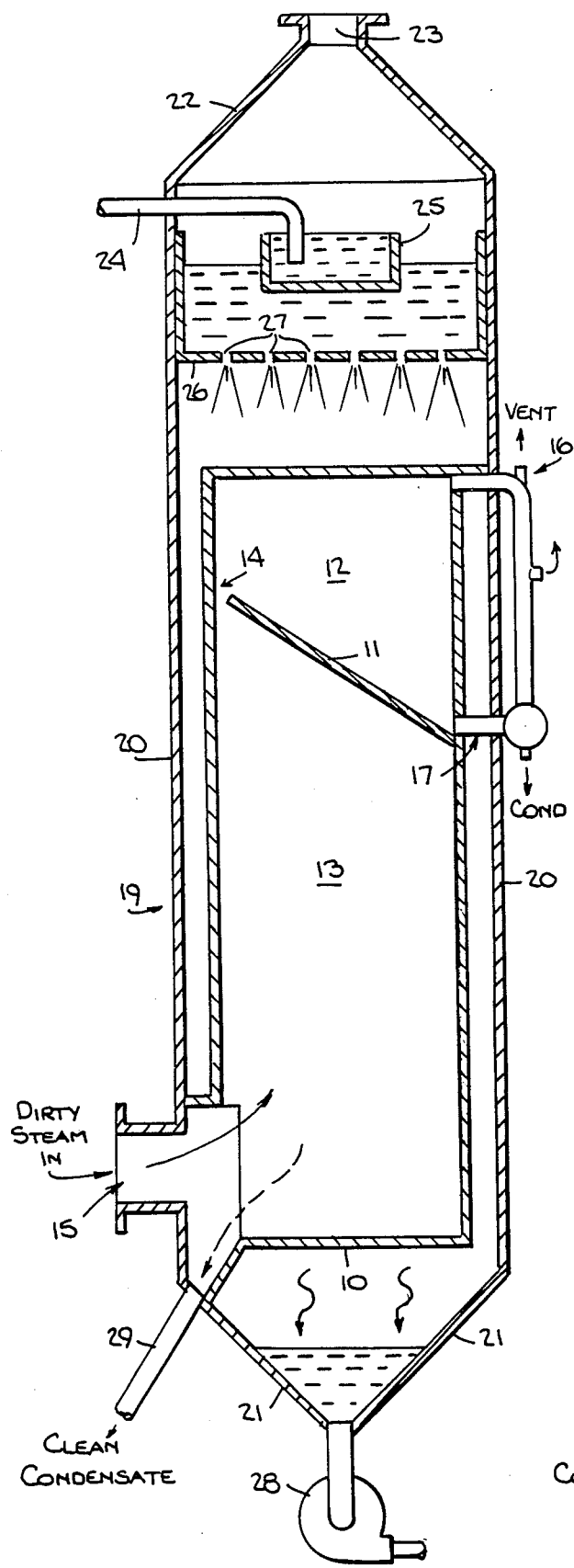
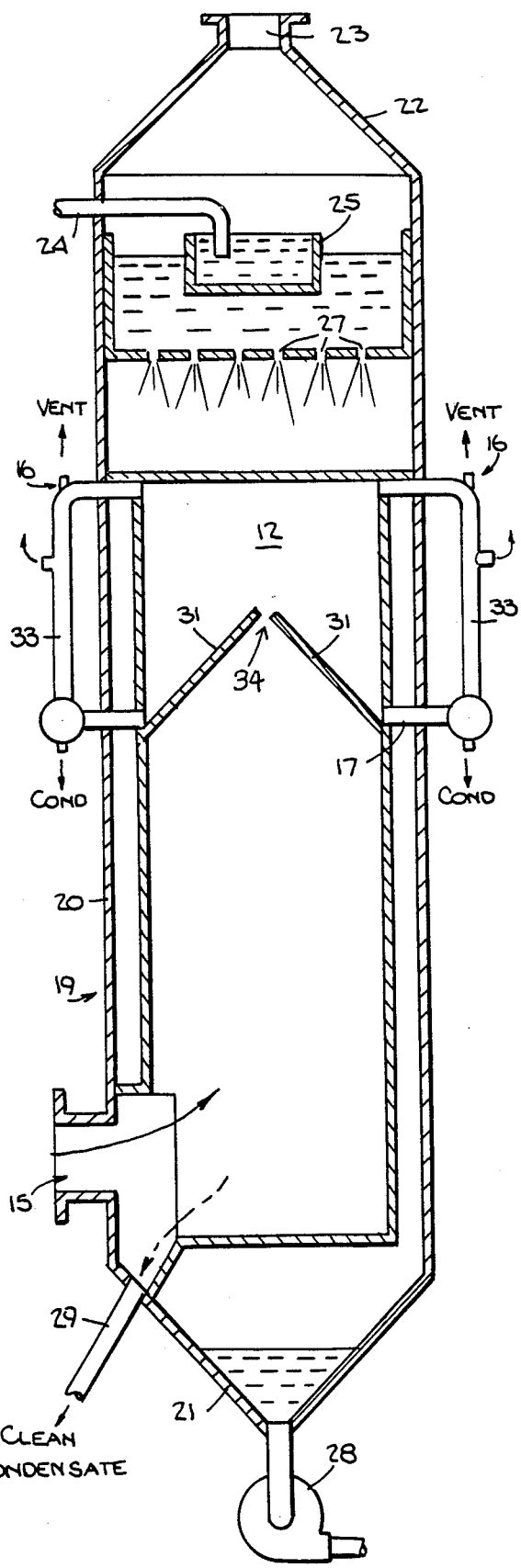

SELECTIVE CONDENSATION APPARATUS

BACKGROUND OF THE INVENTION

1. Field of the Invention

The invention relates to condensation of vapor by means of a condenser having plate envelopes. Selective condensation is achieved by partitioning the heat exchange elements. This permits, for example, the separate collection of relatively clean and relatively contaminated condensates.

2. Description of the Prior Art

U.S. Pat. No. 4,216,002 discloses a method and apparatus for selective condensation employing plate type heat exchange elements.

Plate type heat exchangers have been described in Curt F. Rosenblad's U.S. Pat. No. 3,332,469.

These prior art references do not, however, show partitions within the plate elements for separation of condensates.

SUMMARY OF THE INVENTION

The selective condensation apparatus of the present invention includes a plurality of spaced separated envelopes, which can be fabricated from pairs of steel plates joined together around their peripheries. The plate elements are vertically disposed within a housing which has an inlet for vapor to be condensed at or near its bottom, an inlet for coolant liquid near its top, a vent and two or more condensate outlets.

The coolant liquid is caused to flow down the surfaces of the upright plate elements to condense vapor within the elements. After passage over the element surfaces the coolant is collected and discharged from the bottom of the condenser housing. In these features the apparatus resembles the condenser of U.S. Pat. No. 4,216,002.

Unlike the plate elements illustrated in the aforementioned patent, the heat exchange elements of the present invention are provided with an internal partition or partitions extending laterally between the walls of the plate envelope across a substantial portion of the element's width, while leaving some space open for passage of vapor from beneath the partition to the space above for the partition. The partitions are inclined so that liquid which condenses in the space within the space element above the partition is directed by the upper surface of the partition to condensate outlet which leads the condensate out of the condenser housing. Condensate formed below the partition is discharged through an outlet at or near the lower end of the plate element, to be led out of the housing near the housing's bottom.

The partition can be formed by welding the two plates of the heat exchange element together along a line, or it can be a separate piece attached to the opposed plates by welding. The tightness of the weld is not critical because it will not be subject to any significant hydrostatic head and the pressure differential will always be in the direction of preferred leakage.

The easier to condense vapor will, of course, condense first, in the lower portion of the plate element, below the partition, while the harder to condense vapor will tend to condense above the partition. The separate streams of condensate from below and above the partition will thus represent different condensibilities.

In a typical application, steam contaminated by volatile vapor components can be fed into the condenser. The water vapor will condense first, and relatively clean water will exit near the bottom of the condenser as a first condensate stream. The vapor passing above the partition will carry a greater percentage of the volatile contaminants, and the condensate formed above the partition will contain more of the contaminants. Non-condensed vapor and vent gases depart from the same upper portion of the element as the contaminated condensate. Any leakage past the partition will, because of the pressure differential, be clean vapor leaking to the more contaminated side rather than in the other direction.

This selective condensation can be used, for example, to produce separate condensates from steam contaminated by malodorous substance, or substances which have a high biochemical oxygen demand (BOD). The relatively clean stream can be discharged to the environment or put to some other use, while the foul stream containing the contaminants can be passed on for further treatment.

BRIEF DESCRIPTION OF THE DRAWINGS

FIG. 2 is a view in section of a condenser of this invention taken at a plane passing through a heat exchange element.

FIG. 3 is a view similar to that of FIG. 2 showing a different partition arrangement.

DETAILED DESCRIPTION OF PREFERRED EMBODIMENTS

Figure 1:
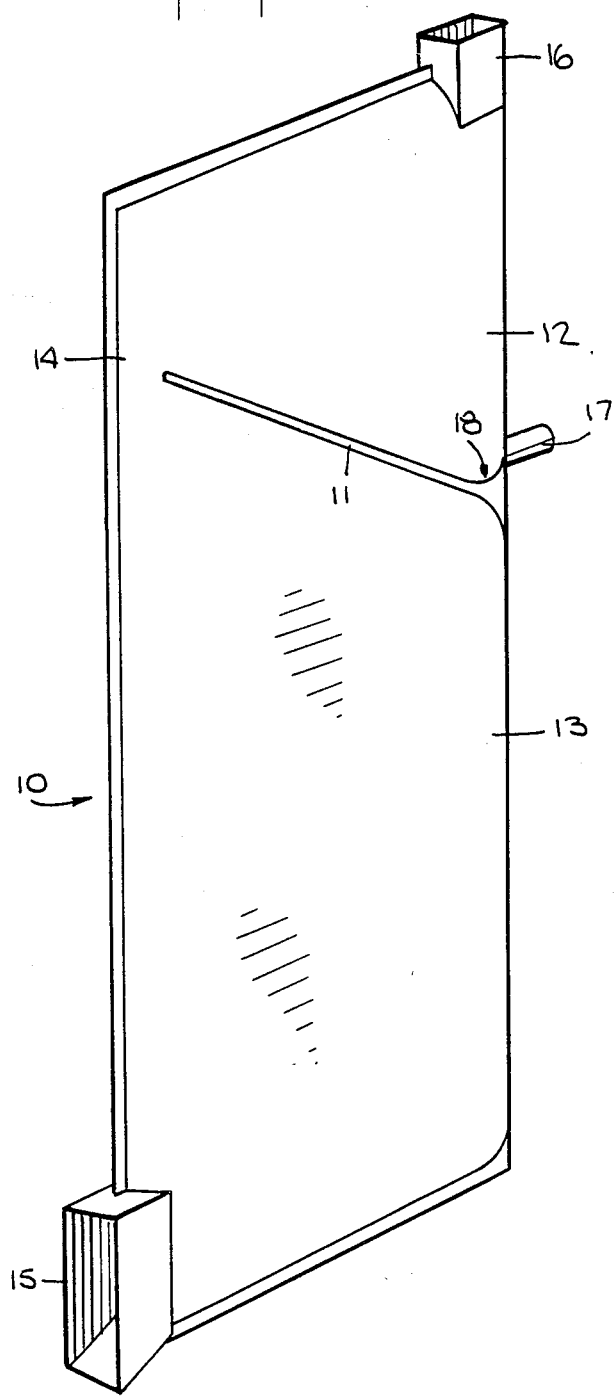
FIG. 1 is a view in perspective of a plate heat exchange element in accordance with the invention.

The plate type heat exchange element 10 of FIG. 1 is formed from a pair of opposed plates of rigid material such as steel joined together around their periphery, with a space between the plates for the passage of fluid.

The element 10 can be fabricated in accordance with the method and apparatus described in U.S. Pat. Nos. 3,512,239 and 3,736,783. The plates may be dimpled, as illustrated in those patents. Of course, fabrication by methods other than the use of internal hydraulic pressure, for example, by the use of a press, is also possible, but the method and apparatus described in these two patents is preferred.

The pair of plates, whether or not they are provided with mating dimples (not illustrated) are spaced away from each other throughout most of the areas bounded by the plate edges, but the plates are shown joined along a line 11, for example by welding. This joinder of the pair of plates provides an internal partition, dividing upper and lower spaces 12 and 13 within the envelope of the plate element.

The partition 11 does not continue across the entire width of the element 10, but leaves a gap 14 open for the passage of vapor from the lower internal space 13 to the upper space 12.

A conduit 15 opens on to the lower internal space 13, and a conduit 16 opens on to the upper internal space 12 at the top of the element 10.

There is also a condensate discharge outlet 17 positioned to open on to the upper internal space 12 at or near the lower end 18 of the partition 11, to which location liquid condensed with the internal space 12 is directed by the inclination of the partition 11.

Steam or other vapor to be condensed enters the element 10 through the conduit 15 to pass upward between the plates. The more readily condensed vapor will condense in the lower space 13 to form a first condensate stream which can exit through the conduit 15.

Vapor uncondensed during its upward passage through the space 13 enters the upper space 12 via the passage 14. Further condensation in the space 12 results in a second condensate which exits through the outlet 17.

Uncondensed vapor exits by way of the conduit 16.

A plurality of plate elements 10 are arranged vertically, in a condenser according to the invention. The plates 10 are spaced, and preferably arranged parallel to each other, as shown for example in U.S. Pat. No. 4,216,002. However, unlike the apparatus shown in U.S. Pat. No. 4,216,002, the arrangement of the invention does not require extensive headers. Since each "split" heat exchange element operates independently of the others in accordance with the present invention, the apparatus is more flexible in that it can be readily expanded or turned down.

The side view in section of FIG. 2 shows one of a plurality of the heat exchange elements 10 suspended within a generally rectangular housing 19 which has upstanding side walls 20, sloping bottom walls 21 for collecting coolant which has passed over the elements 10, and sloping top walls 22 terminating in an opening 23 at the housing's top. Coolant is fed into the housing 19 through a pipe 24 to a tray 25, whence it overflows to a distributor 26 which has a plurality of apertures arranged above the upper edges of the several elements 10 for distributing liquid coolant to the element surfaces, down which the coolant liquid flows as a thin film. This coolant distribution system can be like that of U.S. Pat. No. 4,216,002. Heat is transferred from the vapor entering at 15 to the coolant which passes in countercurrent flow.

The coolant which is not evaporated during its passage over the elements 10 is collected at the bottom of the housing and a pump 28 for the discharged coolant is shown. Also shown in FIG. 2 is an outlet pipe 29 for the first condensate stream formed in the lower internal space 13 of the element 10. This first condensate stream will contain less of volatile contaminants than a second condensate stream withdrawn through the outlet 17 above the partition 11.

The partition 11 is shown as extending about 90% of the way across the element 10, leaving a relatively small passage 14 for the vapor uncondensed in the lower interior space 13 to pass to the upper space 12. Uncondensibles and gases exit by way of the vent 16.

The arrangement shown in FIG. 3 is similar to that of FIG. 2 except that instead of a single slanted partition 11, there are two partition segments 31 extending upward from opposite edges of the elements 10 and defining a gap or passage 34 at the middle of the element 10. Like the partition 11, the partition segments 31 can be formed by simply welding together the two walls of the element 10 along lines. The partition segments 31 collect liquid condensed in the upper interior space 12 of the heat exchange element and direct the collected liquid to outlets 17, each of which is connected to a vent 16 by a pipe 33.

The partition 11 and partition segments 31 are shown arranged at an angle of about 45° to the horizontal for good liquid flow, but that angle could be greater or smaller depending upon the application.

It will be understood that headers interconnecting the several elements 10 of the condensers of FIGS. 2 and 3 could be employed instead of the separate condensate outlets shown, but the arrangement shown is presently preferred for its flexibility of operation.

The condenser of the invention can be used, for example, to condense dirty steam generated in pulp and paper industrial operations, where warm condenser water is re-used. The condenser may have many elements 10 arranged parallel to each other, or the elements 10 could be arranged radially about a central axis in a generally cylindrical housing.

Modifications, applications and structural variations of the apparatus described in terms of preferred embodiments will suggest themselves to those acquainted with the art of evaporators and condensors, and accordingly are considered to be within the spirit and scope of the invention.

What is claimed is:

1. A falling film surface condenser for selective condensation of vapor comprising at least one plate element including a pair of plates joined around their peripheries and spaced apart throughout substantially all of the area defined within said peripheries so as to allow for the flow of vapor through the plate element; a slanting internal partition located between and joining the plates across part of the width of the plate element from an upper partition end spaced from said peripheries to a lower partition and sealingly secured at a side edge of the plate element, said partition separating upper and lower internal spaces within the plate element, means for introducing vapor to be condensed in said plate element, and at least two outlet means for condensates formed by vapor condensing within the plate element and a liquid coolant distribution means located above the plate element such that the vapor passes in countercurrent flow to the liquid coolant distributed to said plate element.

2. The surface condenser of claim 1 wherein the partition slants at an angle of about 45° to the horizontal when the element is in an upright operating orientation.

3. The surface condenser of claim 1 wherein said at least two outlet means comprise one condensate outlet located near the bottom of the plate element and the other condensate outlet located near a point at which said partition is sealingly secured at a side edge of the plate element.

4. The surface condenser of claim 1 wherein the means for introducing vapor is located near the bottom of the condenser, and the surface condenser further includes a vent near the top of the at least one plate element.

5. The surface condenser of claim 1 wherein said at least one plate element comprises a plurality of plate elements located within a housing.

* * * * *